United States Patent
Houston

[11] 3,937,646
[45] Feb. 10, 1976

[54] EVAPORATION APPARATUS OF SPECIAL MATERIAL

[75] Inventor: James E. Houston, Grand Island, N.Y.

[73] Assignee: Hooker Chemicals & Plastics Corporation, Niagara Falls, N.Y.

[22] Filed: Nov. 29, 1973

[21] Appl. No.: 420,357

[52] U.S. Cl. ............... 159/23; 159/27 R; 159/28 R; 159/DIG. 15; 75/125; 75/128 N
[51] Int. Cl.² .. B01D 1/00; B01D 1/06; C22C 38/16
[58] Field of Search... 75/125, 126 C, 128 N, 128 W; 202/267; 159/DIG. 15, 28 R

[56] References Cited
UNITED STATES PATENTS

| | | | |
|---|---|---|---|
| 1,735,980 | 11/1929 | Sadtler | 159/DIG. 15 |
| 1,883,211 | 10/1932 | Wilson | 159/DIG. 15 |
| 2,562,495 | 7/1951 | Holme | 159/13 A |
| 2,689,177 | 9/1954 | Botham et al. | 75/125 |
| 2,698,779 | 1/1955 | Adams et al. | 159/29 |
| 2,709,132 | 5/1955 | Giles | 75/126 C |
| 2,942,657 | 6/1960 | Kleinschmidt | 159/17 R |
| 3,362,813 | 1/1968 | Ziolkowski | 75/125 X |
| 3,645,722 | 2/1972 | Aulenbach | 75/125 X |
| 3,717,455 | 2/1973 | Hede et al. | 75/128 N |
| 3,778,255 | 12/1973 | Ototani et al. | 75/128 N |

*Primary Examiner*—Jack Sofer
*Attorney, Agent, or Firm*—Peter F. Casella; Herbert W. Mylius

[57] ABSTRACT

An evaporation apparatus for use in the evaporation, concentration, and/or purification of solutions containing alkali metal hydroxides and alkali metal chlorides, which apparatus has a liquid receiving chamber for the solutions being processed, a flow-through heating zone containing heat transfer elements, a separation chamber for forming a liquid-vapor mixture of the solution being processed, passageways connecting said chambers and said zones, and baffle and distribution means positioned within said chambers, zones and/or passageways, the improvement which comprises forming at least a portion of those surfaces of the said heat transfer elements, chambers, zones, passageways, baffle and distribution means of said apparatus which are in contact with the solution of said alkali metal hydroxide and said alkali metal chloride at temperatures in excess of about 50°C of a ferritic stainless steel having the following composition:

| | |
|---|---|
| Carbon | Up to 0.01% by weight |
| Manganese | Up to 0.40% by weight |
| Phosphorus | Up to 0.02% by weight |
| Sulfur | Up to 0.02% by weight |
| Silicon | Up to 0.40% by weight |
| Nitrogen | Up to 0.015% by weight |
| Copper | Up to 0.20% by weight |
| Nickel + copper | Up to 0.50% by weight |
| Chromium | 25.0 to 27.5% by weight |
| Molybdenum | 0.75 to 1.50% by weight |
| Iron | Balance |

6 Claims, 1 Drawing Figure

U.S. Patent   Feb. 10, 1976   3,937,646
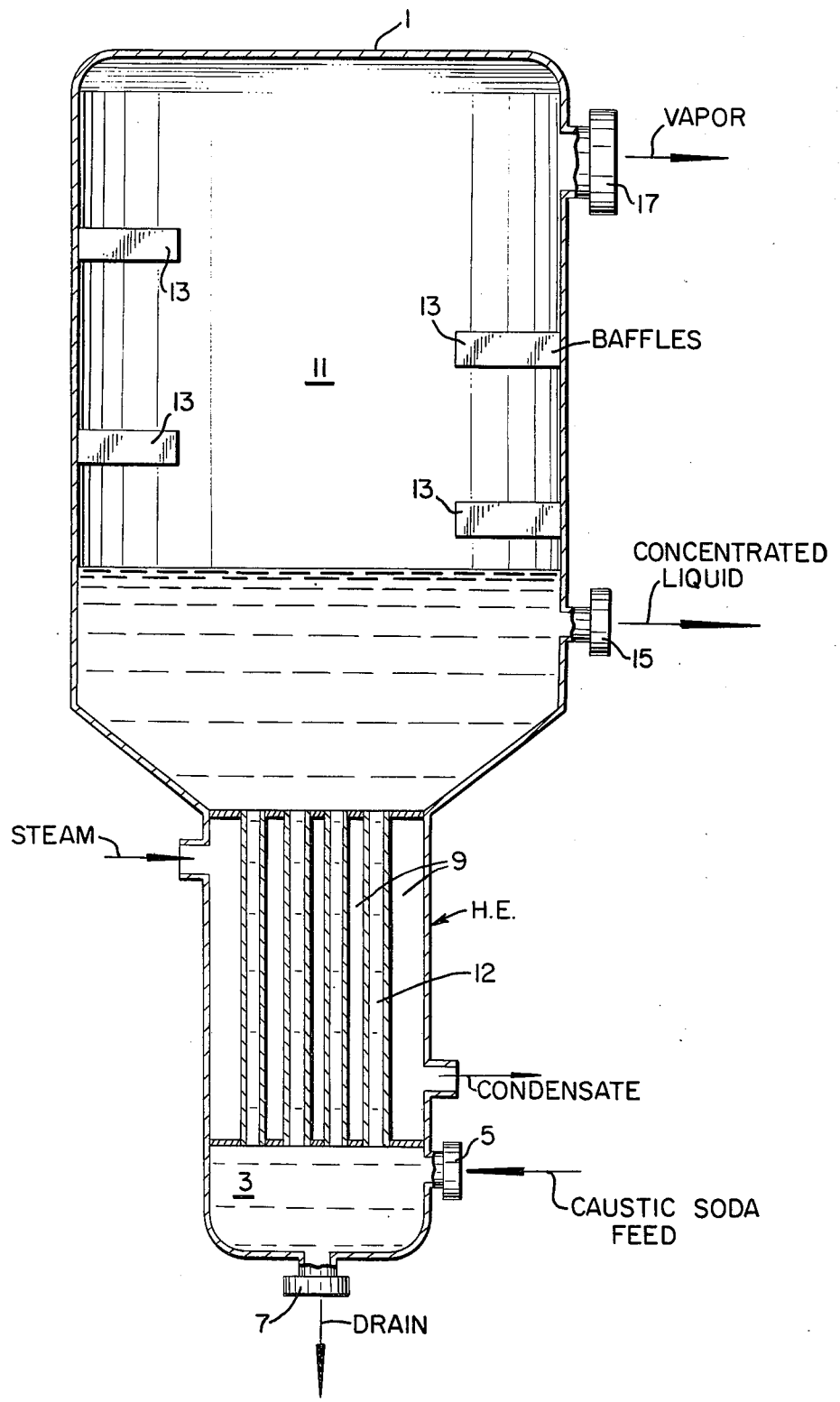

EVAPORATION APPARATUS OF SPECIAL MATERIAL

This invention relates to an apparatus and process for the evaporation, concentration and/or purification of solutions containing alkali metal hydroxides and alkali metal chlorides and, more particularly, it relates to an improved material of construction for use on those surfaces of the apparatus which are in contact with the solution being processes at elevated temperatures.

In the processing of various chemicals, it is frequently desirable to subject solutions or slurries of these chemicals to evaporation in order to obtain the chemicals in a more marketable form. Such evaporation treatments effect the concentration of the solution or slurry being treated and frequently effect a purification of the solution or slurry by crystallization of either impurities or the desired product.

Over the years, various different types of evaporators have been utilized in these processes, depending upon the characteristics of the materials being treated. Typical of these types are rising film evaporators, falling film evaporators, Calandria evaporators, and forced circulation evaporators, using both external and internal pumping arrangements. These different types of evaporators have been operated as single effect evaporators, multiple effect evaporators, recompression evaporators, and the like.

As has been indicated, the choice of the particular type of evaporator used has depended upon the characteristics of the material which is being treated. Moreover, the materials of construction of the evaporators, and in particular those surfaces within the evaporator which, come in the contact with the material being treated, have also been selected on the basis of the chemical and physical characteristics of the materials being treated as well as the temperature and pressure conditions which have to be utilized in the evaporation system.

These considerations become particularly important, for example when dealing with the treatment of aqueous alkali metal hydroxide solutions, such as those which result from the electrolysis of aqueous alkali metal chloride solutions in diaphragm cells. These solutions which, initially contain from about 8 to 14 percent by weight of the alkali metal hydroxide, up to 18 percent by weight of alkali metal chloride and alkali metal chlorate up to 0.05 percent by weight, are heated at temperatures within the range of about 50° to 200°C at pressures of from about 1 to 100 PSIA to produce a more concentrated alkali metal hydroxide material, typically having an alkali metal hydroxide content of about 35 to 73 percent by weight, with an alkali metal chloride content of up to about 8 percent by weight, and with an alkali metal chlorate content of up to 0.2 percent by weight. With these solutions, and under these operating conditions, the materials of construction of the evaporation equipment are subjected not only to severe corrosive attack by the alkali metal hydroxides but, additionally, are subjected to chloride stress cracking, particularly in the tubes in the heat exchange portion of the apparatus.

Heretofore, various materials of construction have been proposed for apparatus of this type which is to be used for the evaporation, concentration and purification of aqueous alkali metal hydroxide solutions. The materials proposed have included various conventional stainless steels such as 304, 304L, 310, 316, 316L, and the like. For this use, these materials have, at best, been only partially successful, the rate of corrosion and the amount of stress cracking being sufficiently high under the more severe operating conditions as to often necessitate replacement in a matter of several months. None of these have thus been uniformly satisfactory from the long term commercial standpoint. Accordingly, the conventional material of construction for evaporators used with aqueous alkali metal hydroxide solutions has been nickel. Although from a performance standpont, nickel is quite satisfactory, because of its high cost, there has been a continuing effort to find a suitable, less expensive substitute. Up to the present time, however, these attempts have not been successful.

It is, therefore, an object of the present invention to provide an improved evaporation apparatus for use in the evaporation, concentration and purification of aqueous solutions containing alkali metal hydroxides and alkali metal chlorides, both with and without alkali metal chlorates.

A further object of the present invention is to provide an improved evaporation apparatus formed of a material of construction having a corrosion resistance equivalent to that of nickel but whose cost is appreciably less than that of nickel.

These and other objects will become apparent to those skilled in the art from the description of the invention which follows.

Pursuant to the above objects, the present invention provides, in an evaporation apparatus for use in the evaporation, concentration and purification of solutions containing alkali metal hydroxides and alkali metal chlorides, which apparatus has a liquid receiving chamber for the material to be processed, a flow through heating zone containing heat transfer elements, a separation chamber for forming a liquid-vapor mixture, passageways connecting said chambers and zones and baffle and distribution means positioned within said chambers, zones and passageways, the improvement which comprises forming at least those surfaces of the said chambers, zones, passageways, baffle and distribution means of said apparatus which are in contact with the solution of said alkali metal hydroxide-alkali metal chloride material at temperatures in excess of about 50°C of a ferritic stainless steel having the following composition:

| | |
|---|---|
| Carbon | Up to 0.01% by weight |
| Manganese | Up to 0.40% by weight |
| Phosphorus | Up to 0.02% by weight |
| Sulfur | Up to 0.02% by weight |
| Silicon | Up to 0.40% by weight |
| Nitrogen | Up to 0.015% by weight |
| Copper | Up to 0.20% by weight |
| Nickel + copper | Up to 0.50% by weight |
| Chromium | 25.0 to 27.5% by weight |
| Molybdenum | 0.75 to 1.50% by weight |
| Iron | Balance |

By the use of this material of construction, there is obtained an evaporation apparatus which may be successfully operated over a broad range of operating conditions and over extended periods of time without the necessity for being shut down for replacement of component parts due to corrosion and/or stress cracking, but which cost appreciably less than comparable apparatus fabricated from nickel.

More specifically, in the practice of the present invention, it has been found that the ferritic stainless steel, having the composition set forth hereinabove, may be used as a substantially complete replacement for nickel throughout an entire evaporation system for use in the evaporation, concentration and purification of aqueous alkali metal hydroxide-alkali metal chloride solutions. Typically, these evaporation systems are made up of one or more evaporated units, which units or apparatus are designed to effect the evaporation, under vacuum, of the aqueous alkali metal hydroxide-alkali metal chloride solutions, such as the caustic soda cell liquor from an electrolytic diaphragm cell, to produce a concentrated, purified sodium hydroxide product. The evaporation apparatus may be of various types as are known in the art to be suitable for use with such caustic soda solutions, such as rising film type evaporators, forced circulation evaporators with either internal or external circulation means, and the like. Regardless of the specific type of evaporator apparatus used, these units all include a liquid receiving chamber into which the solutions which are being processed are introduced, e.g., the caustic soda catholyte liquor from a diaphragm type electrolytic cell. Typically, this chamber will be in the lower portion of the apparatus, in communication with a flow-through heating zone which contains heat transfer elements. The specific nature of the liquid receiving chamber may vary, however, depending upon the particular type of evaporator. Thus, in some instances, it may be a separate, distinct chamber, while in others it may be a pipe or other conduit or merely the chamber or housing of the circulating pump. For convenience, it is to be understood that where reference is made herein to a "liquid receiving chamber" it is intended to mean that portion of the apparatus into which the solution to be processed is introduced, whatever its specific configuration may be.

The flow-through heating zone may be of any suitable type, although generally, it is in the form of a steam chest containing heat exchange or boiler tubes. Typically, the aqueous sodium hydroxide-sodium chloride solution is passed through the tubes, which may be arranged either vertically or horizontally, with the steam chest unit being positioned either internally or externally of the evaporation apparatus. With this arrangement, the steam or other heat exchange medium is passed through the steam chest, around the exterior of the heating tubes. Alternatively, however, a steam chest or heat exchanger may be used in which the steam or other heat exchange media is passed through the tubes, with the solution being processed passing externally of these tubes. Additionally, suitable passageways will be provided for introducing the solutions under treatment from the liquid receiving chamber into the heat exchanger or heating zone. Depending upon the configuration of the apparatus and the placement of the heating zone, these passageways may be either internal or external of the evaporation apparatus.

Suitable passageways are also provided between the heating zone and a separation chamber, in which chamber a liquid-vapor mixture of the solution being processed is formed. The separation chamber, which is normally operated under vacumn conditions, may also be provided with baffle or distribution means which aid in the uniform distribution of the liquid-vapor mixture across the full cross section of the separation chamber i.e., effecting release of the vapor from the liquor while minimizing liquor entrainment and carry-over with the vapors being released. Additionally, suitable passageways are also provided for returning the liquid portion of the mixture to the liquid receiving chamber, from the separation chamber, from which it is then recycled through the heating zone, back into the separation chamber. In many instances, baffle or other distribution means may be provided in the liquid receiving chamber, the heating zone and the various passageways, as well as in the separation chamber, to obtain the desired distribution and flow of the solution being treated.

FIG. 1 shows in vertical section a typical evaporator which comprises a body 1 having a liquid receiving chamber 3. Solutions which are being processed, e.g. the caustic soda catholyte liquor from a diaphragm type electrolytic cell, enter chamber 3 from inlet 5. Chamber 3 is suitably equipped with drain 7. Heating zone 9 is equipped with heat transfer elements, suitably heat exchange tubes 12 connected with an external heat source, not shown. The apparatus has a separation chamber 11 which may be equipped with baffles 13 to aid in separation of vapors. Separation chamber 11 has a liquid outlet 15 and a vapor outlet 17 for removal ov concentrated solutions and vapors respectively, from the evaporator apparatus.

The evaporation apparatus may be operated, separately, as a single effect evaporator or may be combined with one or more additional units in a multiple effect evaporation system. Typically, in such latter type of system, e.g., a triple effect evaporation system, steam is introduced into the heating zone or steam chest of the first effect evaporator as the heating media while the hot vapors from the separation chamber of the first effect evaporator are withdrawn and introduced into the heating zone or steam chest of the second effect evaporator as the heating media. Similarly, the hot vapors from the separation chamber of the second effect evaporator are withdrawn and introduced into the heating zone or steam chest of the third effect evaporator as the heating media for this unit. The sodium hydroxide-sodium chloride containing solution to be treated, e.g. caustic cell liquor from a diaphragm type electrolytic cell, is introduced into the liquid receiving chamber of the third effect evaporator and the initial concentration and purification of this solution is carried out in this unit. The partially concentrated and purified solution is then passed into the liquid receiving chamber of the second effect evaporator, in which further concentration and purification of the solution is carried out. The resulting solution is then passed into the liquid receiving chamber of the first effect evaporator in which the concentration and purification is completed and from which a concentrated, purified caustic soda solution is attained as the product. Alternately liquor may be introduced into the second effect evaporator and then to the third effect and then to the first effect.

It is, thus, seen that in the first effect evaporation unit, the highest temperatures and greatest sodium hydroxide concentrations are encountered, whereas in the third effect evaporation unit, the highest chloride concentrations are encountered. Typically, in the first effect evaporation unit, the temperatures encountered will be within the range of about 120° to 200°C, the sodium hydroxide concentrations will be within the range of about 30 to 73 weight per cent, the sodium chloride concentrations will be within the range of about 4 to 10 weight per cent and the pressures will be within the range of about 10 to 100 pounds per square inch absolute. In the third effect evaporation unit, however, typically, temperatures will be within the range of about 40° to 70°C, sodium hydroxide concentrations within the range of about 9 to 20 weight per cent, sodium chloride concentrations within the range of about 10 to 18 weight per cent and pressures will be within the range of about 0 to 2 pounds per square inch absolute. Generally, in the second effect evaporation unit, the conditions will be intermediate between those in the first and third effect evaporation units, temperatures within the range of about 70° to 120°C, sodium hydroxide concentrations within the range of about 20 to 30 weight per cent, sodium chloride concentrations within the range of about 6 to 14 weight per cent and pressures within the range of about 3 to 15 pounds per square inch absolute being typical. Moreover, where only a single effect evaporator is used, rather than a multiple effect evaporation system as has been described above, the temperature, pressure and chemical concentration conditions which will be encountered within this single evaporation apparatus or unit, will generally be typical of that indicated for the first effect of a triple effect system.

From the above, it is seen that the materials used in the construction of the evaporation apparatus or units will be subjected to varying concentrations of sodium hydroxide and sodium chloride, in both liquid and vapor forms, over an extended range of temperature and pressure conditions. In actual operation, however, it has been found that the corrosion and chloride stress cracking becomes increasingly severe when the temperatures encountered are in excess of about 50°C. Under such conditions, and particularly at temperatures in excess of about 100°C, the various stainless steel compositions which have heretofore been tried as substitutes for nickel, have been found to crack and corrode appreciably in relatively short periods of time, so as to make their use commercially unfeasible. In this regard, it is to be appreciated that the most severe corrosion conditions are encountered in the tubes of the steam chest in the first effect evaporator. Here, the inside of the tubes are in contact with a caustic soda solution having an NaOH content of about 45 percent at about 145°C, while the exterior of the tubes are in contact with steam at a temperature of about 185°C and a pressure of about 150 psig. In this type of service, the effective life of many of the stainless steels is very short, complete failure of some of these occurring within about 3-4 weeks.

While it is true that many parts of the evaporators are not subjected to these extreme corrosion conditions, or even to temperatures as high as 100°C, during normal operations, and hence could be formed of these stainless steels, abnormal operating conditions may occur. At such times, even the surfaces in the second and third effect units may be in contact with unusually high caustic concentrations at abnormally high temperatures. It is, thus advantageous to use a material of construction that will provide corrosion resistance over the entire range of conditions which can be encountered.

Accordingly, the ferritic stainless steel, as has been heretofore described, is utilized to form those surfaces of the evaporation apparatus or unit which are in contact with either the solutions of sodium hydroxide and sodium chloride, or the vapors containing entrained solutions of sodium hydroxide and sodium chloride, at temperatures which are in excess of 50°C. These surfaces are, as has been indicated hereinabove, such surfaces of the liquid receiving chamber, flow through heating zone, separation chamber, passageways, baffle and distribution means and the like of these evaporation units or apparatus. Alternatively, however, the entire evaporation apparatus may be formed of the ferritic stainless material, rather than just those portions which will be in contact with the solution and/or vapors at temperatures in excess of about 50°C.

As a further alternative, of course, only the interior surfaces of the evaporation unit or apparatus may be formed of the ferritic stainless steel as has been described. This may be accomplished by cladding a less corrosion resistant material, such as mild steel, with the ferritic stainless steel alloy, using any suitable technique, such as rolling, brazing, welding, explosion bonding, or the like, Although the use of a clad material may be somewhat less expensive, it does present the problem of maintaining an integral bond between the more corrosive outer material and the corrosion resistant ferritic stainless steel inner layer, particularly during various forming, welding and assembly operations in the manufacture of the evaporator unit. It is for this reason that in the preferred embodiment of the present invention, the ferritic stainless steel, as has been described, is used as such, rather than as a clad material. In this manner, the problems of maintaining a bond between the metallic surfaces is eliminated and an evaporator unit is produced which may be used for either the first, second or third effect evaporator in a total evaporation system, or as the sole evaporation apparatus, where a multiple effect evaporation system is not utilized.

The ferritic stainless steel, having the composition as has been described, is characterized by its very low levels of carbon and a carbon plus nitrogen content which is significantly lower than that of other stainless steels. Moreover, in its most preferred embodiment, it is free from nickel. This material is produced in an electron-beam continuous-hearth refining process in which the molten metal is exposed for an extended period to a very hard vacuum (e.g. 0.5 microns) while being heated by means of an electron beam source. This heat source provides localized regions of intense superheat in the molten metal which promotes volatilization and removal of tramp impurity elements. The refined metal is then continuously cast, using electron beam heat for hot topping. The method and apparatus for making this ferritic stainless steel are described in U.S. Pat. No. 3,764,297 which issued Oct. 9, 1973 to Coad and Palmer.

In forming the evaporation unit of the ferritic stainless steel material, in general, conventional fabrication techniques may be utilized. Thus, conventional machining and forming operations may be utilized in fabricating the component parts of the evaporator unit and these parts may then be assembled using various welding techniques, to form the finished evaporator unit. The units thus formed may then be used under the entire range of temperature, pressure and chemical concentration conditions, as have been described hereinabove and are found to have a service life which is at least equivalent to that of comparable units formed of nickel.

In order that those skilled in the art may better understand the present invention and the manner in which it may be practiced, the following specific examples are given. In theses examples, unless otherwise indicated, parts and percents are by weight and temperatures are in degrees centigrade. Additionally, the material referred to in the examples as "E-Brite 264-1" is a ferritic stainless steel having the composition as has been set forth heretofore, supplied by Airco Vacuum Metals. It is to be appreciated, however, that these examples are merely exemplary of the present invention and the manner in which it may be practiced and are not to be taken as a limitation thereof.

In these examples, a standard 3-2-1 triple effect evaporation system was utilized, which system included three conventional forced circulation evaporator units. In the separation chamber or vapor body of the first effect evaporator, coupons of various metals, measuring approximately 1.5 inches by 2.75 inches were suspended. Some of these were in the liquid in the chamber and where they were in contact with a solution containing approximately 45 percent by weight sodium hydroxide, 5.5 percent by weight sodium chloride, 1.0 percent by weight sodium sulfate and about 0.05 percent by weight sodium chlorate, at a temperature of about 140°C. Other coupons were suspended in the vapor portion of the chamber where they were in contact with super heated water vapor at a temperature of about 140°Centigrade, which vapor contained entrained traces of liquid from the liquid portion of the chamber. The metal coupons were maintained in the evaporator under these conditions while the evaporator system was operating for a period of 33 days. At the end of this time, the coupons were removed and the amount of corrosion which had taken place was measured. This corrosion was then expressed as the rate of corrosion in mils per year. Using this procedure, the results obtained are set forth in the following Table. It is further to be noted that some of the metal coupon had dimples stressed into them while on others, a weld bead was drawn across the coupon. In the Table, those coupons which were stressed, by virtue of the dimples, are indicated as S while those which were welded are indicated as W.

EXAMPLE 8

Using the apparatus as described above, some of the nickel tubes in the first effect steam chest were replaced with tubes of the following materials:
E-Brite
304 Stainless Steel
309 Stainless Steel
316 Stainless Steel
50A Titanium The 304 Stainless Steel tubes had an initial wall thickness of 0.083 inches; the 50A Titanium tubes, 0.035 inches; while the remaining tubes had an initial wall thickness of 0.065 inches.

The evaporator system was operated as described above. After only 2 hours of operation, the 50A Titanium tubes were found to have failed and had to be burned out of the steam chest. After 25 days of operation, the 304, 309 and 316 Stainless Steel tubes were removed from the steam chest, at which time it was found that the 316 Stainless Steel tubes had collapsed. The 304 and 309 Stainless Steel tubes were examined and it was found that both the 304 and 309 tubes displayed an appreciable thinning out at each end, the 304 tubes having the wall thickness at each end reduced to 0.040–0.042 from the initial 0.083 inches and the 309 tubes having the wall thickness at each end reduced to 0.041–0.043 inches from the initial 0.065 inches. Additionally, there was a general thinning out over the entire length of the 304 tubes of up to 20 mils in the 25 days which amounted to a general corrosion rate of 292 mils/year. The 309 tubes showed a general thinning out over the entire length of about 1.0 mils in the 25 days, or a general corrosion rate of about 14.6 mils/year.

After 118 days of operation, the E-Brite tubes were removed and examined. At the ends of the tubes, the wall thickness was reduced only to 0.61–0.063 inches from the initial 0.065 inches. Additionally, the thinning out over the entire tube length was a maximum of

| Example | Material | Condition | Corrosion Rate Mils/Year | | Remarks |
|---|---|---|---|---|---|
| | | | Liquid Phase | Vapor Phase | |
| 1 | E-Brite | S | 0.11 | 0.27 | Slight brownish discoloration, no evidence of any attack |
| | | W | 0.65 | 0.61 | Intergranular corrosion in sensitized areas adjacent to welds |
| 2 | 304 Stainless Steel | S | 18.08 | 0.67 | Scattered general corrosion and some light pitting |
| | | W | 20.37 | 0.53 | Scattered general corrosion and some light pitting |
| 3 | 309 Stainless Steel | S | 0.52 | 0.60 | Scattered general corrosion and some light pitting |
| | | W | 5.66 | 1.28 | Scattered general corrosion and some light pitting |
| 4 | 316 Stainless Steel | S | 11.45 | 0.73 | Scattered general corrosion and some light pitting |
| | | W | 11.43 | 0.76 | Scattered general corrosion and some light pitting |
| 5 | 400 Monel | S | 1.08 | 0.30 | Scattered general corrosion |
| | | W | 0.41 | 0.58 | Some surface tarnish, scattered light general corrosion |
| 6 | 200 Nickel | S | 0.37 | 0.34 | Some surface tarnish, scattered light general corrosion |
| | | W | 0.62 | 0.31 | Some surface tarnish, scattered light general corrosion |
| 7 | 50A Titanium | S | 84.36 | 6.76 | Very heavy general corrosion and surface etch |
| | | W | 148.27 | 6.84 | Very heavy general corrosion and surface etch, some preferential weld attack | about 1.0 mil in 118 days, which is a general corrosion rate of about 3.1 mil/year.

From the above results, it can be seen that the ferritic stainless steel alloy, designated as E-Brite 26-1 has an appreciably lower corrosion rate than do the various stainless steel tested and, further, that the corrosion rate of this material is substantially equivalent to that of nickel. The material, is, thus, a suitable substitute for nickel as the material of construction in evaporation units for use with solutions containing sodium hydroxide and sodium chloride, at temperatures in excess of about 50°C.

EXAMPLE 9

An evaporation unit of the conventional forced circulation type is fabricated using the E Brite 26-1 material. In this unit, the material is used for the liquid receiving chamber, the tubes and tube sheets in the steam chest, the separation chamber or vapor body, the baffle and distribution members within the vapor body and the liquid receiving chamber and the passageways between these chambers. When used for the evaporation of cathode cell liquor from a diaphragm cell, which cell liquor contains about 11 percent by weight sodium hydroxide, 16 percent by weight sodium chloride, 0.4 percent by weight sodium sulfate, 0.01 percent by weight sodium chlorate, at a temperature of about 80°C, the corrosion resistance of these units is at least equivalent to that of comparable units fabricated from nickel. This is true whether the unit is used as a single effect evaporator, as the first effect evaporator in a triple effect evaporation system or as the first, second and/or third effect evaporators in such a system.

While there have been described various embodiments of the invention, the compositions, methods and apparatus described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In an evaporation apparatus for use in the evaporation concentration, and/or purification of solutions containing alkali metal hydroxides and alkali metal chlorides, which apparatus has a liquid receiving chamber for the solutions being processed, a flowthrough heating zone containing heat transfer elements, a separation chamber for forming a liquid-vapor mixture of the solution being processed, passageways connecting said chambers and said zones, and baffle and distribution means positioned within said chambers, zones and/or passageways, the improvement which comprises forming at least a portion of those surfaces of the said chambers, zones and passageways, baffle and distribution means of said apparatus which are in contact with the solution of and/or vapors of the solution of said alkali metal hydroxide-alkali metal chloride containing solution at temperatures in excess of about 50°C of a ferritic stainless steel having the following composition:

| | |
|---|---|
| Carbon | Up to 0.01% by weight |
| Manganese | Up to 0.40% by weight |
| Phosphorus | Up to 0.02% by weight |
| Sulfur | Up to 0.02% by weight |
| Silicon | Up to 0.40% by weight |
| Nitrogen | Up to 0.015% by weight |
| Copper | Up to 0.20% by weight |
| Nickel + copper | Up to 0.50% by weight |
| Chromium | 25.0 to 27.5% by weight |
| Molybdenum | 0.75 to 1.50% by weight |
| Iron | Balance |

2. The apparatus as claimed in claim 1 wherein substantially all of the interior surfaces thereof are formed of the said ferritic stainless steel.

3. The apparatus as claimed in claim 1 wherein substantially all of the apparatus is formed of the said ferritic stainless steel.

4. The apparatus as claimed in claim 1 in which at least the heat transfer elements are formed of the said ferritic stainless steel.

5. A multiple effect evaporation system comprised of first, second and third effect evaporation units in which at least the first effect evaporation unit is formed of the apparatus as claimed in claim 1.

6. The multiple effect evaporation system as claimed in claim 5 wherein the heat transfer elements of the first, second and third effect units are formed of the said ferritic stainless steel.

* * * * *